No. 737,044. PATENTED AUG. 25, 1903.
D. J. THORNE.
NUT LOCK.
APPLICATION FILED MAY 1, 1903.

NO MODEL.

Witnesses
Charles Morgan
Harry Allis Chandler

Inventor
D. J. THORNE.
BY
Chandler & Chandler
Attorneys

No. 737,044. Patented August 25, 1903.

UNITED STATES PATENT OFFICE.

DAVID JOHN THORNE, OF LARDO, CANADA.

NUT-LOCK.

SPECIFICATION forming part of Letters Patent No. 737,044, dated August 25, 1903.

Application filed May 1, 1903. Serial No. 155,192. (No model.)

*To all whom it may concern:*

Be it known that I, DAVID JOHN THORNE, a subject of the King of England, residing at Lardo, in the Province of British Columbia, Dominion of Canada, have invented certain new and useful Improvements in Nut-Locks; and I do hereby declare the following to be a full, clear, and exact description of the invention, such as will enable others skilled in the art to which it appertains to make and use the same.

This invention relates to nut-locks; and it has for its object to provide a lock embodying a washer having an annular rack on its upper face and a spring-pawl mounted in a nut for movement freely over the rack when rotated in one direction and adapted to engage the rack when it is attempted to rotate the nut in the opposite direction.

A further object of the invention is to provide a construction and arrangement wherein the pawl may be readily moved to inoperative position when the nut is to be disengaged and wherein there will be a minimum of parts, which may be easily and quickly assembled.

Figure 1:
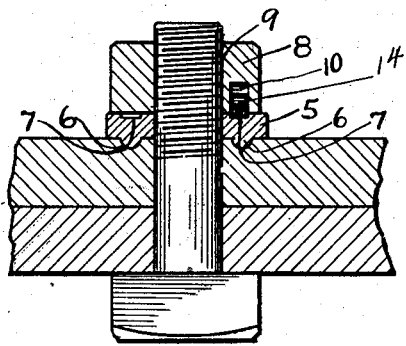
Figure 2:
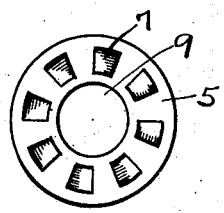
Figure 3:
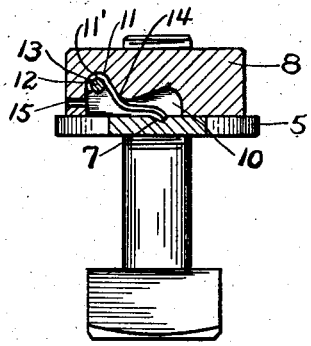

In the drawings forming a portion of this specification, and in which like numerals of reference indicate similar parts in the several views, Figure 1 is a vertical section through a nut and washer equipped in accordance with the present invention. Fig. 2 is a top plan view of the washer. Fig. 3 is a vertical section through one side of the nut, the retaining-pawl being in elevation.

Referring now to the drawings, there is employed a washer 5, on the under face of which are depending lugs 6, which are designed to engage seats in the face of a body, through which is passed the bolt provided with the present nut-locking mechanism, the upper face of the washer having sockets 7 therein, forming a rack.

There is shown at 8 a nut having the central threaded perforation 9, and in the lower face of the nut at one side of the perforation is a recess 10, one end of which is deepened, as shown at 11, and communicating with this deepened portion of the recess is the perforation 11', which passes through the outer face of the nut and through both side walls of the recess and is designed to receive a pin 12 for holding the pawl in place.

The pawl consists of a spring-plate one end of which is bent into hook form, as shown at 13, this hook portion being displaced upwardly and engaged in the deepened portion of the recess 10, the opposite end of the spring-plate being given a compound curve and projecting from the shallower portion of the recess at the opposite end from the deepened portion. The spring-plate rests against the shoulder 14 at the edge of the deepened portion of the recess, so that when the free end of the plate is moved into the recess it will be placed under tension and the spring-plate will stand normally with its free end projected from the recess to engage the rack-face of the washer. With this construction it will be seen that as the nut is screwed down upon the bolt, on which has first been disposed the washer, the spring-pawl will be brought to engage the rack of the washer, and as the nut is further rotated the plate will be pressed upwardly and placed under tension, so that it will be impossible to rotate the nut rearwardly without first disengaging the spring plate or pawl from the rack.

To permit of disengagement of the pawl from the rack, a second perforation 15 is formed transversely of the nut and communicates with the deeper end portion of the recess of the nut, said perforation extending in the direction of lateral extension of the recess, so that a bar or other suitable instrument may be passed therethrough and into engagement with the spring-pawl to raise the latter from the rack, when the nut may be reversely rotated.

It will be understood that in practice modifications of the specific construction shown may be made and that any suitable materials and proportions may be used for the various parts without departing from the spirit of the invention.

What is claimed is—

The combination with a washer having a ratchet-face, of a nut having a recess in its lower face including a shallow portion and a deeper portion and an intervening shoulder, a pawl consisting of a spring-plate having one end bent into hook form and disposed in the deeper portion of the recess and its opposite end projecting from the shallower portion of the recess, said pawl between its ends resting against the shoulder and a pin engaged with the nut and through the hook of the pawl, said nut having a perforation therein opening into the deeper portion of the recess and extending in the direction of projection of the free end of the pawl to receive an instrument to displace the pawl.

In testimony whereof I affix my signature in presence of two witnesses.

DAVID JOHN THORNE.

Witnesses:
R. BANFIELD,
CHARLES MILLER.